United States Patent
Turski et al.

(10) Patent No.: US 8,290,666 B2
(45) Date of Patent: Oct. 16, 2012

(54) METHOD AND SYSTEM FOR CONTROLLING A VEHICLE ENGINE DURING PERFORMANCE DRIVING EVENTS

(75) Inventors: Michael P. Turski, Rochester Hills, MI (US); Kevin A. O'Dea, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 876 days.

(21) Appl. No.: 12/390,697

(22) Filed: Feb. 23, 2009

(65) Prior Publication Data

US 2010/0217489 A1    Aug. 26, 2010

(51) Int. Cl.
  *G06F 17/00*    (2006.01)
(52) U.S. Cl. ............................ 701/48; 701/54
(58) Field of Classification Search .................... 701/36, 701/51, 67, 80, 48, 54, 110
  See application file for complete search history.

(56) References Cited

U.S. PATENT DOCUMENTS

| | | | | |
|---|---|---|---|---|
| 5,369,584 A | * | 11/1994 | Kajiwara | 701/48 |
| 5,513,107 A | * | 4/1996 | Gormley | 701/48 |
| 7,162,370 B2 | * | 1/2007 | Obradovich | 701/301 |
| 2010/0211278 A1 | * | 8/2010 | Craig et al. | 701/70 |

FOREIGN PATENT DOCUMENTS

JP    06219191 A  *  8/1994

* cited by examiner

*Primary Examiner* — Faye M. Fleming
(74) *Attorney, Agent, or Firm* — Lionel D. Anderson; Reising Ethington P.C.

(57) ABSTRACT

A system and method for controlling a vehicle engine during one or more performance driving events, such as a performance takeoff, shifting or cornering event. The engine control system may be used to maintain stability when the vehicle is being driven in a competitive or aggressive fashion by temporarily controlling the vehicle engine through the manipulation of engine torque, engine speed or some other means. If the engine control system receives competing command signals from different vehicle subsystems, then the system may arbitrate or otherwise manage the competing command signals so that different subsystems can function together properly. In one embodiment, the engine control system blends the commands signals from two or more subsystems.

22 Claims, 5 Drawing Sheets

METHOD AND SYSTEM FOR CONTROLLING A VEHICLE ENGINE DURING PERFORMANCE DRIVING EVENTS

TECHNICAL FIELD

The present invention generally relates to controlling a vehicle engine and, more particularly, to controlling a vehicle engine during certain performance driving events or maneuvers.

BACKGROUND

During performance driving, a driver may use a variety of driving techniques and engage in different maneuvers. Some examples of performance driving maneuvers include take-off maneuvers (e.g., dumping or side-stepping the clutch), shifting maneuvers (e.g., no-lift upshifting or power shifting), and cornering maneuvers (e.g., entering or exiting an aggressive turn), to cite a few.

If multiple performance driving maneuvers overlap each other (e.g., the driver is still performing a no-lift upshift maneuver as they enter an aggressive turn), then the vehicle may produce multiple engine command signals; different command signals to address different performance driving maneuvers. In some instances, the different engine command signals may not be compatible with one another and could require some method and/or system for arbitrating between them.

SUMMARY OF THE INVENTION

According to one embodiment, there is provided a method for controlling a vehicle engine. The method generally comprises the steps of: a) sensing at least one vehicle operating condition; b) determining if multiple vehicle subsystems are active, wherein an active vehicle subsystem can provide command signals for temporarily controlling the vehicle engine; and c) if multiple vehicle subsystems are active, then using the vehicle operating condition to manage the output of the multiple vehicle subsystems.

According to another embodiment, there is provided another method for controlling a vehicle engine. The method generally comprises the steps of: a) receiving engine command signals from first and second vehicle subsystems; b) producing blended engine command signals from the engine command signals from the first and second vehicle subsystems; and c) controlling the vehicle engine with the blended engine command signals.

According to another embodiment, there is provided an engine control system for use with a vehicle. The engine control system generally comprises: a sensor for providing at least one vehicle operating condition; a first vehicle subsystem for providing a first set of engine command signals; a second vehicle subsystem for providing a second set of engine command signals; and an electronic vehicle module coupled to the sensor, the first vehicle subsystem, and the second vehicle subsystem. The electronic vehicle module uses the vehicle operating condition to manage the first and second set of engine command signals.

BRIEF DESCRIPTION OF THE DRAWINGS

Preferred exemplary embodiments of the invention will hereinafter be described in conjunction with the appended drawings, wherein like designations denote like elements, and wherein:

FIG. 3 is a more detailed illustration of a step that may be used in the method of FIG. 2;

FIG. 4 is a more detailed illustration of a step that may be used in the method of FIG. 2; FIG. 5 is a more detailed illustration of a step that may be used in the method of FIG. 2.

DETAILED DESCRIPTION OF THE PREFERRED EMBODIMENTS

Figure 1:
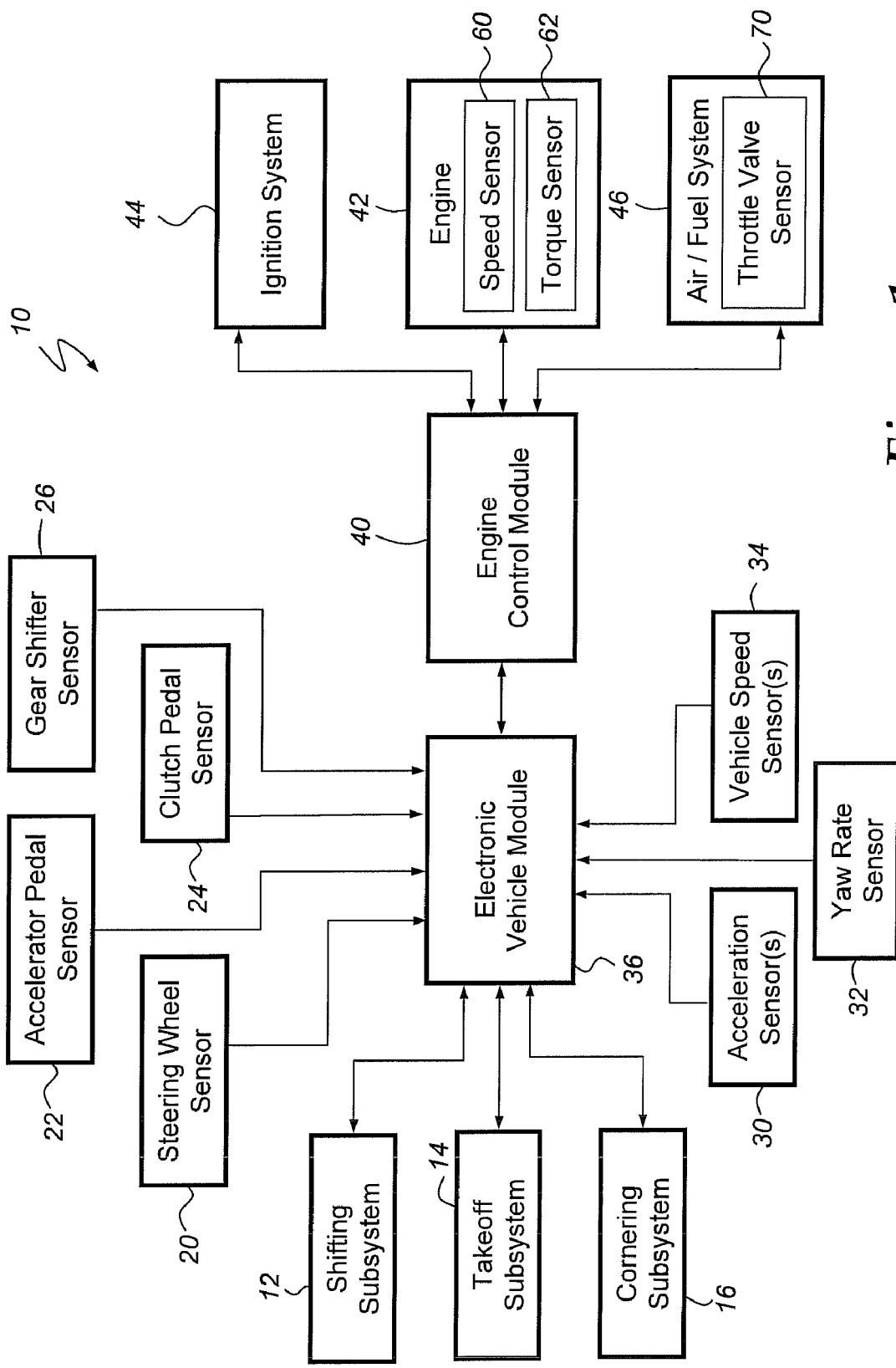
FIG. 1 is a block diagram of an exemplary engine control system.

With reference to FIG. 1, there is shown portions of an exemplary engine control system 10 that may be used to control a vehicle engine during certain performance driving events, such as those pertaining to take-off, shifting, and cornering maneuvers. According to one embodiment, engine control system 10 manages or arbitrates between multiple vehicle subsystems—each vehicle subsystem can be designed to address certain performance driving events—when multiple subsystems are providing engine command signals at the same time. It should be appreciated that FIG. 1 is only a schematic representation of certain portions of an engine control system and that the methods described herein could be used with any number of different systems and are not limited to the exemplary one shown here. According to this particular embodiment, engine control system 10 includes a shifting subsystem 12, take-off subsystem 14, cornering subsystem 16, steering wheel sensor 20, accelerator pedal sensor 22, clutch pedal sensor 24, gear shifter sensor 26, one or more acceleration sensor(s) 30, yaw rate sensor 32, one or more vehicle speed sensor(s) 34, electronic vehicle module 36, engine control module 40, engine 42, ignition system 44, and air/fuel system 46.

Shifting subsystem 12 may include any combination of electronic instructions and/or hardware components, and is a vehicle subsystem designed to temporarily control vehicle engine 42 if certain performance shifting events involving a manual or automatic transmission are anticipated or detected. For example, if shifting subsystem 12 anticipates, detects, or otherwise determines that a no-lift upshift is likely to occur (i.e., when a driver upshifts a manual transmission without letting up on the accelerator pedal), then subsystem 12 may output engine command signals specifically designed to manipulate engine operation during this event. Shifting subsystem 12 could also be used to address other performance shifting events, such as power shifts (i.e., when a driver shifts a manual transmission without significantly engaging the clutch), heel-and-toe techniques (i.e., when a driver operates the accelerator and brake pedals simultaneously with one foot while braking and downshifting), downshifts, as well as any other known maneuver or technique that involves a manual or automatic transmission. One example of a suitable shifting subsystem is described in U.S. patent application Ser. No. 12/362,973 filed Jan. 30, 2009, which is assigned to the present assignee.

Takeoff subsystem 14 may include any combination of electronic instructions and/or hardware components, and is a vehicle subsystem designed to temporarily control vehicle engine 42 if certain performance takeoff events involving vehicle acceleration are anticipated or detected. For example, if takeoff subsystem 14 anticipates, detects, or otherwise determines that the driver is going to dump or side-step the clutch (i.e., when the driver has both the clutch and accelerator pedals engaged with the vehicle at or near a stop, and then rapidly releases the clutch), then subsystem 14 may output engine command signals specifically designed to manipulate engine operation during this event. Takeoff subsystem 14 could also be used to address other performance takeoff events, such as brake torque events (i.e., when the driver engages both the brake and the accelerator pedals with the vehicle at or near a stop, and then lets go of the brake), as well as any other maneuver or technique that involves takeoffs or aggressive acceleration. As evidenced by the preceding examples, takeoff subsystem 14 may be used with vehicles having manual or automatic transmissions. One example of a suitable takeoff subsystem is described in U.S. patent application Ser. No. 12/340,806 filed Dec. 22, 2008, which is assigned to the present assignee.

Cornering subsystem 16 may include any combination of electronic instructions and/or hardware components, and is a vehicle subsystem designed to temporarily control vehicle engine 42 if certain performance cornering or handling events are anticipated or detected. For example, if cornering subsystem 16 anticipates, detects, or otherwise determines that the driver is going to enter or exit a turn at a high rate of speed and/or acceleration, then subsystem 16 may output engine command signals specifically designed to manipulate engine operation during these events. Cornering subsystem 16 could also be used to address other performance cornering or handling circumstances, such as different maneuvers performed while the driver is turning, cornering, banking, etc. (not just entering or exiting a turn), for instance. Cornering subsystem 16 may be used with vehicles having manual or automatic transmissions. One example of a suitable cornering subsystem is described in U.S. patent application Ser. No. 12/340,823 filed Dec. 22, 2008, which is assigned to the present assignee.

Although shifting subsystem 12, takeoff subsystem 14, and cornering subsystem 16 are schematically shown in FIG. 1 as separate and standalone entities, any one of these vehicle subsystems may be integrated, combined, shared or otherwise utilized by other components, devices, modules, etc. in the vehicle. According to one embodiment, each of the vehicle subsystems 12-16 simply includes a collection of electronic instructions in the form of software and/or firmware. These electronic instructions may be stored in the memory of and executed by electronic vehicle module 36 (e.g., a traction control module) or some other electronic module or device in the vehicle. Other embodiments of vehicle subsystems 12-16 may be used instead.

Any number of different sensors, components, devices, modules, subsystems, etc. may provide engine control system 10 with information or other input that could be used with the engine control method described herein. These include, for example, the exemplary sensors shown in FIG. 1 as well as others that are known in the art but are not shown here. It should be appreciated that steering wheel sensor 20, accelerator pedal sensor 22, clutch pedal sensor 24, gear shifter sensor 26, acceleration sensor(s) 30, yaw rate sensor 32, vehicle speed sensor(s) 34, as well as any other sensor located in and/or used by engine control system 10 may be embodied in hardware, software, firmware or some combination thereof. These sensors may directly sense the conditions for which they are provided, or they may indirectly determine or calculate conditions based on readings taken from other sensors, components, devices, modules, subsystems, parts of the system, etc. Furthermore, these sensors may be directly coupled to electronic vehicle module 36, indirectly coupled via other electronic components such as engine control module 40, coupled over a vehicle communications bus, network, etc., or coupled according to some other arrangement known in the art. It is possible for any one of the sensor signals described below to be provided by an engine control module, a transmission control module, a brake control module, a traction control module, or some other component, device, module, subsystem, system, etc. in the vehicle instead of the sensor signals being directly provided by an actual sensor component. These are only some of the possibilities, as any type of sensor or sensor arrangement known in the art could also be used.

Steering wheel sensor 20 provides engine control system 10 with a steering signal that is generally representative of the position, movement and/or state of a steering wheel. There are a number of different steering wheel sensors known and used in the art, any one of which may be used here. For instance, steering wheel sensor 20 could be located near the point where the steering wheel is attached to the steering column, or it could be located further down the steering column away from the steering wheel. These are only two possibilities, as numerous other examples could also be employed.

Accelerator pedal sensor 22 provides engine control system 10 with an accelerator signal that is generally representative of the position, movement and/or state of an accelerator pedal. Skilled artisans will appreciate that a number of different types of accelerator pedal sensors could be used; these include non-contact-type sensors (e.g., optical sensors, electromagnetic sensors, etc.), as well as contact-type sensors (e.g., potentiometers, contact switches, etc.). In an exemplary embodiment, accelerator pedal sensor 12 includes a non-contact-type sensor with a Hall-Effect element and is operably coupled to the accelerator pedal so that it can determine the current position, rotational velocity and/or rotational acceleration of the accelerator pedal.

Clutch pedal sensor 24 provides engine control system 10 with a clutch signal that is generally representative of the position, movement and/or state of a clutch pedal. As with the accelerator pedal sensor, there are a number of different types of sensors that could be used, including the non-contact-type and contact-type sensors mentioned above. In an exemplary embodiment, clutch pedal sensor 24 includes a non-contact-type sensor with a Hall-effect element that is operably coupled to the clutch pedal so that it can determine its current position, rotational velocity and/or rotational acceleration. In another exemplary embodiment, clutch pedal sensor 24 includes a contact-type sensor with an electronic switch that indicates the status or state of the clutch pedal; that is, whether or not the clutch pedal is 'engaged' or 'disengaged'. Other measurements or readings could be used to determine or calculate the position or status of the clutch pedal, instead of directly sensing it. For instance, clutch pedal sensor 24 may utilize the displacement of a master and/or slave cylinder, the state of a clutch release bearing, the speeds of input and/or output shafts, or some other known method to gather information regarding the clutch pedal.

Gear shifter sensor 26 provides engine control system 10 with a gear signal that is generally representative of the present gear selection of a manual and/or automatic transmission. For example, gear shifter sensor 26 may include an actual sensing device located near the gear shifter or it may be located elsewhere in the vehicle powertrain, to cite a few possibilities. In an exemplary embodiment, gear shifter sensor 26 provides current gear selection information to electronic vehicle module 36 or some other device so that the module can not only determine the current gear of the manual transmission, but can also keep a record of the shifting or gear transition history (e.g., determining that a manual transmission has undergone a $1^{st}$ to $2^{nd}$ gear upshift, a $3^{rd}$ to $2^{nd}$ gear downshift, etc.; or determining that an automatic transmission has experienced a 'park' to 'drive' transition, a 'reverse' to 'neutral' transition, etc.).

Acceleration sensor(s) 30 provide engine control system 10 with acceleration signals that are generally representative of an acceleration being experienced by the vehicle. Any combination of longitudinal, lateral and/or vertical acceleration sensors may be used, for example. Lateral acceleration is sometimes noticeable as a centrifugal force moving a vehicle to the outside of a curve when a vehicle is cornering. In one embodiment, acceleration sensor(s) 30 include a lateral accelerometer that is co-located in the same housing as yaw rate sensor 32 or is integrated together as one unit. Some examples of suitable acceleration sensor types include microelectromechanical system (MEMS) type sensors and tuning fork-type sensors, although any type of acceleration sensor may be used. Depending on the particular needs of the system, acceleration sensor(s) may be single- or multi-axis sensors, may detect acceleration and/or deceleration, may detect the magnitude and/or the direction of the acceleration as a vector quantity, may sense or measure acceleration directly, or may calculate or deduce acceleration from other readings like vehicle speed readings, to cite a few possibilities.

Yaw rate sensor 32 provides engine control system 10 with a yaw rate signal that is generally representative of the vehicle's angular velocity or speed around its vertical axis; i.e., the vehicle yaw rate. Yaw rate sensor 32 may be a stand alone sensor, it may be integrated within the same housing as acceleration sensor(s) 30 or some other device, or it may be used to provide other devices—in addition to engine control system 10—with information, to cite a few examples. In one particular embodiment, yaw rate sensor 32 is mounted in the passenger compartment under the center console and can include a gyroscopic device, as is known in the art. Two exemplary yaw rate sensor types that may be used are piezoelectric-type sensors and micromechanical-type sensors, both of which are based on the Coriolis effect. Any type of yaw rate sensor known in the art may be used here, including those that directly sense or measure the vehicle's yaw rate, along with those that calculate or deduce the yaw rate from other data, measurements, readings, etc.

Vehicle speed sensor(s) 34 provide engine control system 10 with speed signals that are indicative of the speed or velocity of the vehicle. According to one embodiment, individual speed sensors are coupled to each of the vehicle's four wheels and separately report the rotational velocity of the four wheels. In another embodiment, vehicle speed sensor(s) 34 determine the velocity of the vehicle relative to ground by directing radar, laser or other signals towards the ground and analyzing the reflected signals. Vehicle speed sensor(s) 34 may include electromagnetic elements, optical elements, or any other technology known in the art; they are not limited to any particular speed sensor type.

Electronic vehicle module 36 is an electronic device that is located in the vehicle and may be used to control, or at least influence, engine performance during a performance driving event or maneuver. Depending on the particular embodiment, electronic vehicle module 36 may be a stand-alone component (as schematically illustrated in FIG. 1), it may be incorporated or included within another vehicle electronic module (such as an engine control module), or it may be part of a larger network or system (such as a traction or stability control system, etc.), to name a few possibilities. According to an exemplary embodiment, electronic vehicle module 36 is a traction control module and receives input from vehicle subsystems 12-16, sensors 20-34, as well as from items 42-46 via engine control module 40. The traction control module may perform a number of functions; these could include, for example, controlling certain engine operations during specific operating conditions (e.g., manipulating engine torque and/or speed during performance takeoff, shifting and/or cornering events), controlling power distribution during slippery road conditions, maintaining a stability control system for the vehicle, recording information and data, communicating with other devices inside or outside of the vehicle, as well as all other known functions.

Electronic vehicle module 36 may include any combination of electronic processing devices, memory devices, input/output (I/O) devices, and other known components. The electronic vehicle module can be electronically connected to other vehicle devices and modules via a suitable vehicle communications network, and can interact with them when required. In an exemplary embodiment, electronic vehicle module 36 includes an electronic processing device that executes electronic instructions that are part of software, firmware, programs, algorithms, scripts, state machines, etc. and can be stored in memory devices of module 36. These electronic instructions may govern the engine control processes and methods described herein. Electronic vehicle module 36 could also store various sensor readings, predetermined values, and look-up tables used by one or more algorithms, for example. These are, of course, only some of the possible functions and capabilities of electronic vehicle module 36, as other embodiments could also be used.

Engine control module 40 may perform numerous tasks related to engine performance and, in the exemplary embodiment shown here, acts as an intermediary between electronic vehicle module 36 and items 44-46. As will be subsequently explained, electronic vehicle module 36 can control engine operation during certain performance driving events by manipulating the torque and/or speed of the engine. One way to achieve this is by sending command signals from electronic vehicle module 36 to items 44-46 via engine control module 40. Another way is for electronic vehicle module 36 to be connected to items 44-46 directly or to be connected through some component other than engine control module 40. Because engine control modules are widely known and understood in the art, a detailed description of one has been omitted here.

Engine 42 can be any type of known vehicle engine, including conventional internal combustion engines such as gasoline and diesel engines, as well as other engine types like hybrid and fuel cell engines. Engine 42 may include a number of sensors and sensing devices, including the exemplary speed sensor 60 and torque sensor 62 shown in FIG. 1. Speed sensor 60 provides engine control system 10 with an engine speed signal that is generally representative of the position, velocity and/or acceleration of engine 42. Various types of engine speed sensors are known and could be used here. In one embodiment, speed sensor 60 includes an electromagnetic device (e.g., a Hall effect element) that is mounted near a rotating magnet attached to the crankshaft so that it can generate an engine speed signal that is representative of engine revolutions per unit of time (e.g., revolutions per minute (RPM)). Torque sensor 62 provides engine control system 10 with an engine torque signal that is generally representative of the torque being generated by the engine. Again, numerous types of engine torque sensors and sensing arrangements are known in the art and could be used. According to an exemplary embodiment, torque sensor 62 is operably coupled to one or more points along an input shaft, an output shaft, or both in the vehicle's drivetrain. Regardless of whether torque sensor 62 is an actual piece of hardware that directly measures engine torque or is embodied in software and calculates engine torque from some other information, the torque sensor may provide electronic vehicle module 36 with engine torque signals that are generally indicative of the torque at one or more places in the vehicle drivetrain (i.e., from the engine to the drive axle(s)).

Ignition system 44 provides a spark plug in engine 42 with a high voltage pulse that can be used to initiate the combustion process, as is known in the art. Depending on the particular embodiment, ignition system 44 may include a combination of hardware and/or software components that are capable of determining the ignition timing of the engine and delivering a spark to the spark plug accordingly. In an exemplary embodiment, ignition system 44 includes one or more spark plugs, ignition coils, ignition modules, and other related hardware and/or software components. It is possible for ignition system 44 to have its own dedicated electronic ignition module that controls certain aspects of the ignition process, such as ignition timing, etc. But it is also possible for ignition system 44 to receive command signals from engine control module 40 or some other source, so that these components control ignition system operation. It should be appreciated that ignition system 44 is merely exemplary and that other systems known in the art could also be used.

Air/fuel system 46 provides a combustion chamber in engine 42 with an air/fuel charge that can be used in the combustion process, as is known in the art. Air/fuel system 46 can include one of a number of different known types of systems. These include, for example, central-point injection (CPI) or central-point fuel injection (CPFI) systems, multi-point fuel injection (MPFI) systems, direct-inject (DI) systems, sequential- and batch-fired fuel injection systems, other types of electronic fuel injection (EFI) systems, as well as any other fuel injected, carbureted or other air/fuel delivery systems. In an exemplary embodiment, air/fuel system 46 is an EFI system that includes a throttle valve sensor 70, a fuel pump (not shown) for pressurizing the fuel, and a nozzle/valve arrangement (not shown) that uses an electronically controlled solenoid to release the pressurized fuel in such a way that it becomes atomized before it is provided to the combustion chamber. As with ignition system 44, air/fuel system 46 could have its own dedicated electronic ignition module that controls certain aspects of the air/fuel delivery process, such as adjusting the air/fuel ratio, or it could receive command signals from engine control module 40 or some other source. Again, other types of air/fuel systems, including those that use carburetors, could be used instead.

Throttle valve sensor 70 provides engine control system 10 with a throttle signal that is generally representative of the present position and/or state of the throttle valve, which in turn is connected to the accelerator pedal and controls the amount of air entering engine 42. Throttle valve sensor 70 may include an actual sensing device located near the throttle valve or it may be located elsewhere and calculate or estimate the throttle valve position based on other information. In an exemplary embodiment, throttle valve sensor 70 is located near a butterfly valve spindle and directly senses the throttle valve state or position, this information is then sent as a throttle signal to electronic vehicle module 36 via engine control module 40. However, other arrangements and connections could be used. In another embodiment, engine control module 40 maintains empirically-based lookup tables or other data structures that indicate the current position and/or state of the throttle valve, and provides this information to vehicle electronic module 36 when requested.

It should be appreciated that the foregoing examples only include some of the potential components that could be included within engine control system 10. For instance, other sensors that could be used include: brake pedal sensors, vehicle inclination sensors, manifold absolute pressure (MAP) sensors, temperature sensors, as well as any other sensor that provides information that could influence performance driving events. As mentioned above, the various sensors could be electronically coupled to engine control system 10 according to a variety of ways and do not need to be directly connected as schematically illustrated in the drawing. Moreover, these and other sensors may be shared by other devices, components, modules, systems, etc. located throughout the vehicle.

Figure 2:
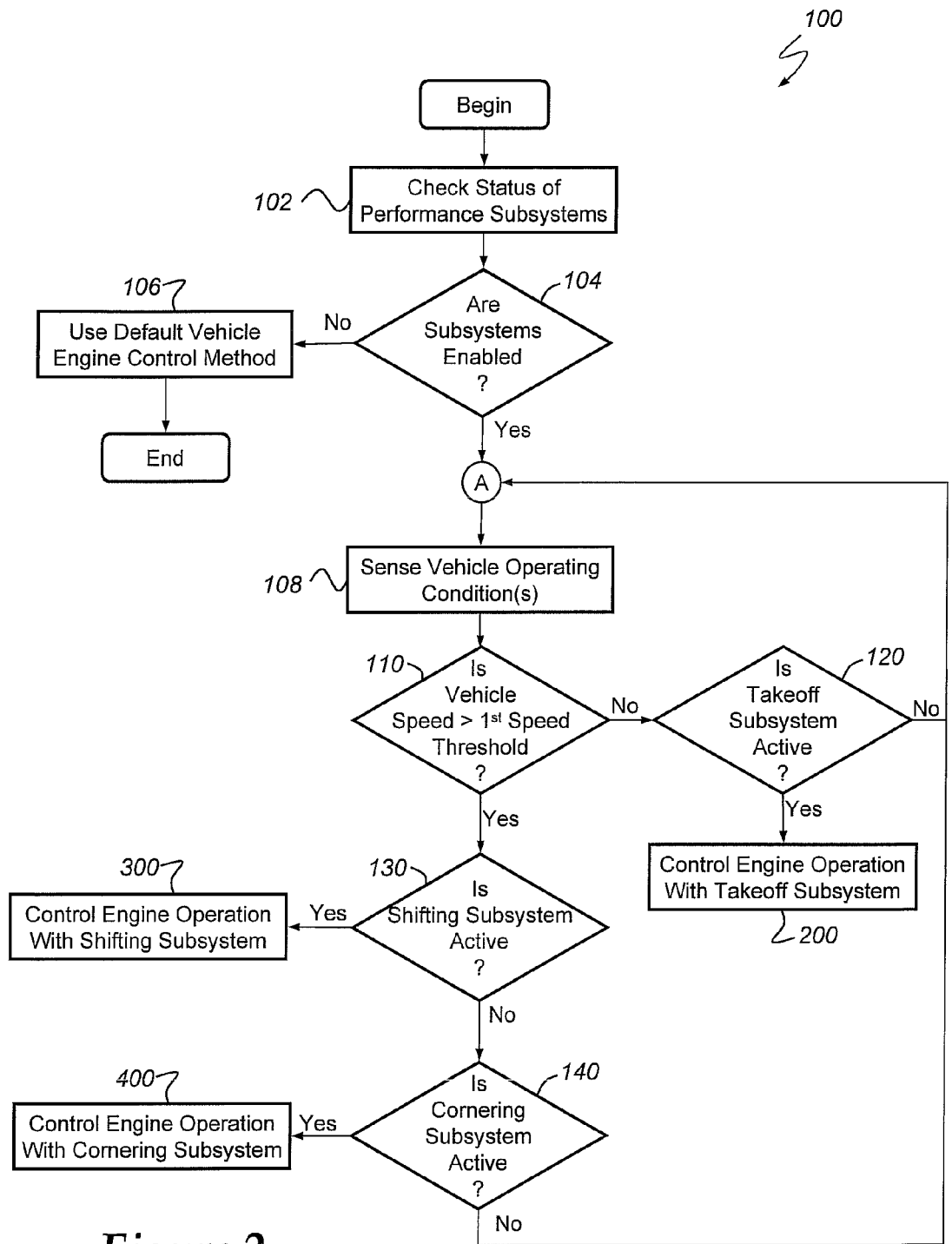
FIG. 2 is a flowchart illustrating an exemplary method for controlling a vehicle engine during one or more performance driving events and may be used with the engine control system of FIG. 1.

Turning now to FIG. 2, there is shown an exemplary embodiment 100 of a method for controlling a vehicle engine during one or more performance driving events, such as a performance takeoff, shifting or cornering event. Method 100 may be used to maintain stability when the vehicle is being driven in a competitive or aggressive fashion by temporarily controlling the vehicle engine through the manipulation of engine torque, engine speed or some other means. To illustrate, consider the example where electronic vehicle module 36 is a traction control module and is part of the vehicle's traction control system. It is possible for the traction control module to receive competing command signals from different vehicle subsystems, where each subsystem is attempting to temporarily control the engine while certain conditions exist. In this scenario, method 100 may arbitrate or otherwise manage the command signals from these competing vehicle subsystems so that they can function together properly.

Beginning with step 102, the method checks the status of the various vehicle subsystems to ensure that each one is enabled. A vehicle subsystem is 'enabled' when it is receiving power and is operating properly; i.e., experiencing no faults or other malfunctions. A vehicle subsystem is 'active' when, due to certain conditions, circumstances, events, etc., it is providing or is ready to provide command signals that temporarily control one or more aspects of engine operation. These command signals may be specifically designed to best control the engine during the particular conditions, circumstances, events, etc. that caused the vehicle subsystem to be active. According to one embodiment, step 102 checks the status of three performance driving subsystems: shifting subsystem 12, takeoff subsystem 14, and cornering subsystem 16 in order to determine if each subsystem is properly enabled. Of course, other subsystems, devices, modules, systems, etc. could also be queried for their status, as performance driving subsystems 12-16 are only some of the possibilities. Some examples of other vehicle subsystems that could be included within engine control system 10 and used with method 100 include braking subsystems, non-takeoff acceleration subsystems, etc.

If one or more vehicle subsystems are not enabled (e.g., experiencing a malfunction or the like), then step 104 may direct the method to use a default engine control method, step 106. For example, if step 104 determines that subsystems 12 and 14 are enabled but subsystem 16 is experiencing a malfunction, then step 106 may simply govern engine control via the accelerator pedal or some other default control technique. In such a case, vehicle subsystems 12-16 could refrain from controlling engine operation until the malfunctioning subsystem is fixed and subsystem 16 is enabled again. It is not necessary, however, for all of the vehicle subsystems to be enabled in order for the method to continue on to step 110. For example, if two out of three vehicle subsystems are enabled, then step 104 could instruct the method to continue on with the knowledge that one of the vehicle subsystems was not available for use. Other techniques for handling enablement or disablement may also be used.

Next, step 108 senses one or more vehicle operating conditions, such as vehicle speed. In one embodiment, step 108 uses vehicle speed sensors 34 to determine the vehicle speed and compares it to a first speed threshold that is quite slow (e.g., within the range 0-15 km/h, inclusive), step 110. This comparison indicates whether the vehicle is stopped or is moving slowly, or if the vehicle is moving at a higher rate of speed. In the exemplary embodiment of FIG. 1, there are a total of three performance driving subsystems available for use, one of which is a performance driving subsystem for lower speeds (takeoff subsystem 14) and two of which are performance driving subsystems for higher speeds (shifting subsystem 12 and cornering subsystem 16). Thus, if step 110 determines that the vehicle is stopped or is operating at a low speed, then takeoff subsystem 14 is the only vehicle subsystem that is available for potential activation. If the vehicle speed exceeds the first speed threshold, then shifting subsystem 12 and/or cornering subsystem 16 could be activated, depending on a variety of other conditions. It should be appreciated that vehicle speed is only one potential vehicle operating condition that could be used by step 110, as steering wheel angle, accelerator pedal position, clutch pedal position, gear shifter selection, vehicle acceleration, yaw rate, engine speed, engine torque, throttle valve position, or any other suitable vehicle operating condition could be used instead. It is also possible for step 110 to evaluate a combination of vehicle operating conditions, as opposed to only considering a single condition like vehicle speed. The first speed threshold may be modifiable so that it can be adjusted or calibrated to meet the preferences of the driver, the particular attributes of the vehicle, etc.

If the vehicle speed is not greater than the first speed threshold, then step 120 determines if takeoff subsystem 14 is active. As mentioned above, takeoff subsystem 14 is designed to temporarily control vehicle engine 42 if certain performance takeoff or acceleration events are anticipated or detected. In order to determine if takeoff subsystem 14 is active, step 120 may query the subsystem directly or it may review one or more vehicle operating conditions in order to see if the conditions or criteria that activate the subsystem are met. In one example, step 120 reviews an accelerator signal from accelerator pedal sensor 22 and a clutch signal from clutch pedal sensor 24, and checks to see if both the accelerator and the clutch are engaged (for manual transmissions) or if just the accelerator is engaged (for automatic transmissions). If these conditions are met, then takeoff subsystem 14 may be activated; if they are not met, then the method can loop back to node A for continued monitoring. Of course, any combination of queries, vehicle operating conditions, etc. may be used by step 120 to determine if takeoff subsystem 14 is active or should be activate.

Figure 3:
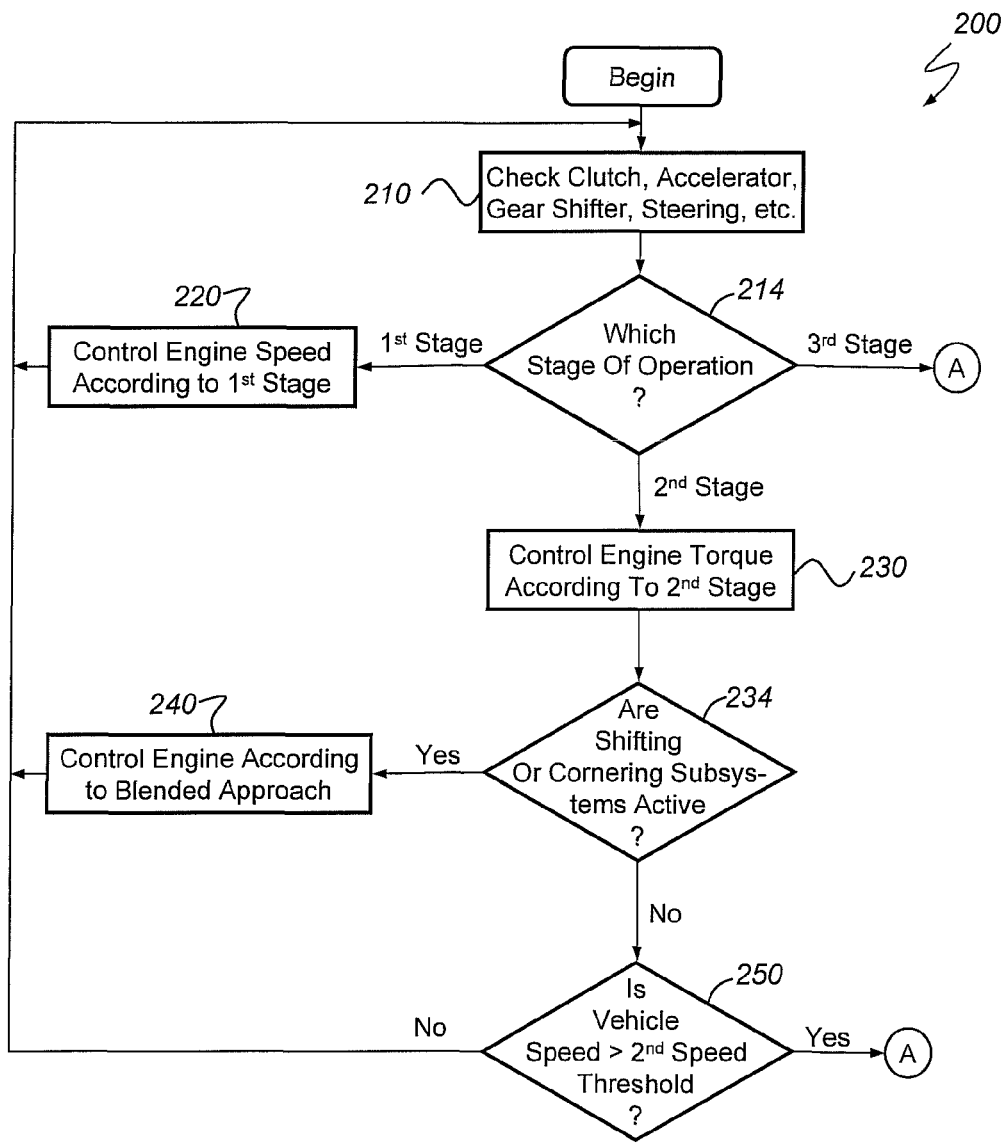
FIG. 3 is a flowchart illustrating an exemplary use of a takeoff subsystem for a vehicle, where

A more detailed illustration of an exemplary embodiment of step 200 is shown in FIG. 3, where the operation of takeoff subsystem 14 is generally broken into three different stages and is intended for use with a manual transmission. A first stage of operation pertains to when a driver has engaged the clutch and accelerator pedals but has not yet let the clutch out; during this first stage of operation, takeoff subsystem 14 may provide engine speed command signals. A second stage of operation pertains to when the driver begins to dump or quickly release the clutch; during this second stage of operation, takeoff subsystem 14 may provide engine torque command signals. A third stage of operation pertains to when the driver has disengaged the accelerator pedal for a certain amount of time; during this third stage control returns to node A, as operation of takeoff subsystem 14 is generally finished. This exemplary three-stage embodiment is for use with a manual transmission and is only provided for purposes of illustration; other techniques and embodiments could also be used, including ones with a fewer or greater number of stages and ones designed for automatic transmissions.

Step 210 checks the position, velocity, acceleration, and/or state of the clutch and accelerator pedals (hereafter collectively referred to as the 'status' of the pedals), along with other pertinent vehicle operating conditions such as gear shifter selection, steering angle, etc. If these vehicle operating conditions indicate that takeoff subsystem 14 is in a first stage of operation, then step 220 may control the engine speed according to one or more techniques, such as by manipulating ignition system 44 and/or air/fuel system 46. Command signals could be used to control ignition timing, cylinder cutout, air/fuel ratio, fuel quantity, throttle position, or any other parameter known to affect engine speed. In one embodiment, step 220 limits or otherwise manipulates the engine speed so that when the clutch is released, the actual engine speed can be blended or otherwise matched with the engine speed then being requested by the driver. A variety of engine speed limiting and matching techniques could be used, including the use of engine speed command signals that operate the throttle valve. During this period of engine speed manipulation, the method may return to step 210 for further monitoring.

If step 214 determines that takeoff subsystem 14 is in a second stage of operation, then step 230 controls the engine torque according to one or more techniques, including those mentioned above for controlling engine speed. In one embodiment, step 230 provides engine torque command signals that control different operational aspects of ignition system 44 and air/fuel system 46 and are intended to maintain vehicle stability during the performance takeoff event. For instance, step 230 could provide engine torque command signals that limit or otherwise control the torque of the engine by advancing, retarding or otherwise manipulating the timing of ignition system 44, or by adjusting the amount or content of the air/fuel charge that is provided by air/fuel system 46. These are only some of the potential ways in which step 230 can control engine torque.

Step 234 determines if shifting subsystem 12, cornering subsystem 16, or any other performance driving subsystem is active. If conditions exist for these other subsystems to be active (these conditions are discussed below in greater detail), then step 240 may control the vehicle engine according to a 'blended approach' that combines the command signals of the active subsystems. Consider the example where the vehicle experiences an aggressive takeoff (e.g., the driver dumps the clutch while engaging the accelerator), followed quickly by an aggressive shifting maneuver (e.g., a no-lift upshift). During this sequence of events, the present method may begin to control the vehicle engine with takeoff subsystem 14 but soon determine that shifting subsystem 12 is also needed. Step 240 may then use a blended approach to generate new engine command signals, where the blended engine command signals incorporate output from both the takeoff and shifting subsystems, as opposed to simply being one or the other. It is possible for step 240 to provide engine command signals that are blended from the takeoff and shifting subsystems 14, 12, that are blended from the takeoff and cornering subsystems 14, 16, that are blended from all three subsystems, or that are blended from some other combination of subsystems, including ones not shown here. Any number of suitable techniques for combining, blending, integrating, etc. the different engine command signals may be used. One exemplary technique uses a proportional or weighted approach to blend the signals; for example, the greater the lateral acceleration (i.e., the more aggressive the turn or corner), the more the blended approach incorporates the output of cornering subsystem 16, for example. As the lateral acceleration increases, so too does the cornering subsystem's contribution to the blended signal. Once step 240 is complete, the method may return to step 210 for further monitoring.

Next, step 250 samples the vehicle speed and compares it to a second speed threshold. Preferably, the second speed threshold is greater than the first speed threshold (e.g., the second speed threshold can be in the range 60-100 km/h), and can be used to determine when the vehicle is traveling at a sufficiently high rate where engine control by takeoff subsystem 14 is no longer needed. If the vehicle speed exceeds the second speed threshold, then the method may return to node A for further monitoring. For example, if the driver completes an aggressive takeoff maneuver and the vehicle is now traveling at 75 km/hour, then the vehicle operating conditions no longer warrant use of takeoff subsystem 14, however, shifting and cornering subsystems 12, 16 may still be needed. If the vehicle speed is less than the second speed threshold, control may return to step 210 for further monitoring.

Returning to step 214, if the driver has sufficiently disengaged the accelerator pedal, then a third stage of operation may be initiated where control of the method returns to node A for further monitoring. For instance, if the driver lifts their foot off of the accelerator pedal so that it releases beyond an engagement point (e.g., 60% of the overall pedal travel) and this disengagement is maintained for one second or more, then step 214 may send control back to node A. If the driver reengages the accelerator pedal beyond the engagement point before the expiration of the time, the timer may be reset. Other criteria and vehicle operating conditions could be used by step 214.

Figure 4:
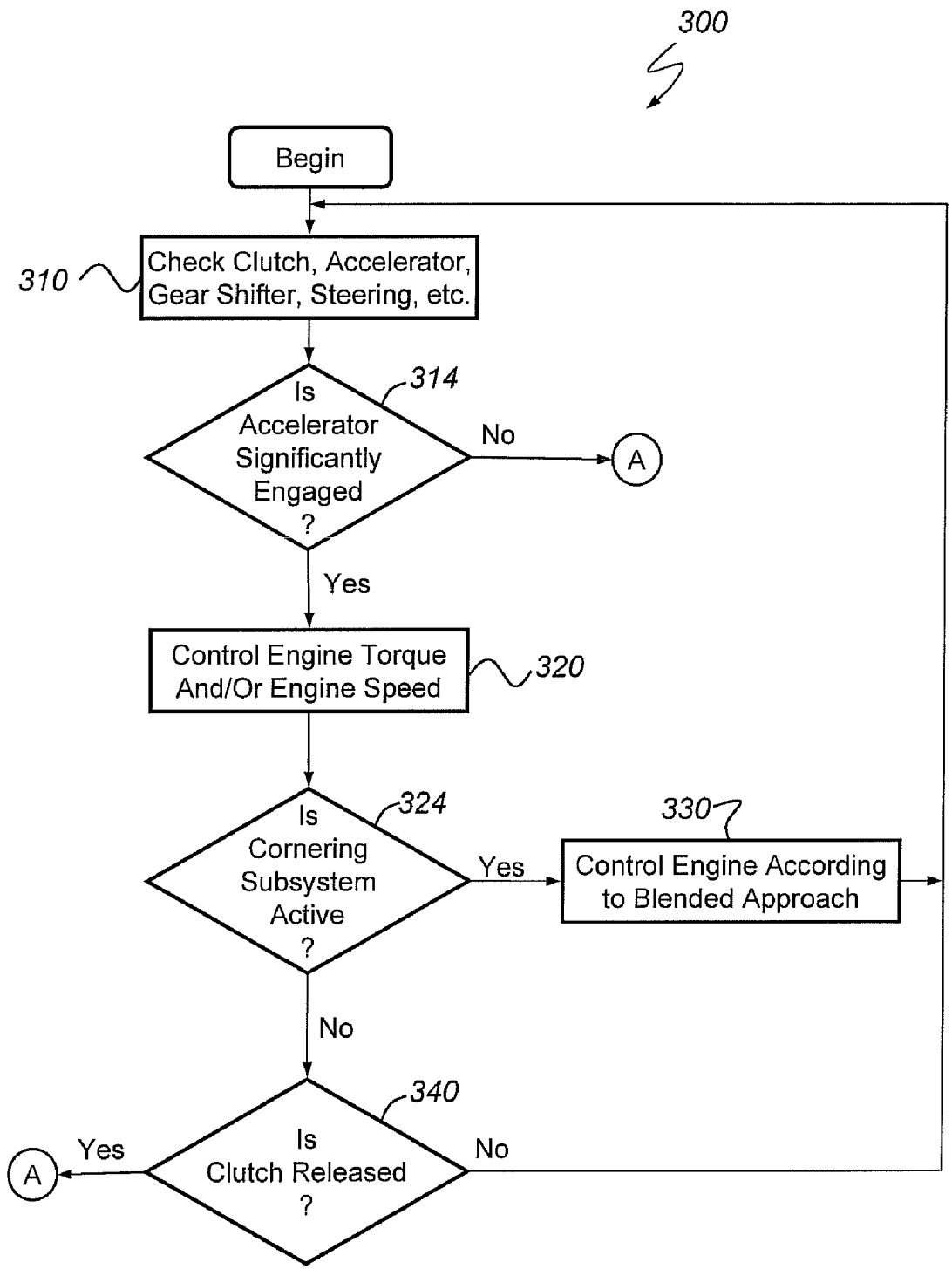
FIG. 4 is a flowchart illustrating an exemplary use of a shifting subsystem for a vehicle, where

Referring back to FIG. 2, if step 110 determines that the vehicle speed is greater than the first speed threshold, then the method checks to see if any of the higher-speed performance driving subsystems (e.g., shifting subsystem 12 and cornering subsystem 16) are active or should be active. In order to determine if vehicle subsystems 12 and 16 are active or should be active, steps 130 and 140 may query the subsystems directly or they may review one or more vehicle operating conditions in order to see if the conditions or criteria that activate vehicle subsystems 12 and 16 are met. If step 130 determines that shifting subsystem 12 is active, then one or more aspects of engine operation may be controlled with that vehicle subsystem, step 300. A more detailed illustration of an exemplary embodiment of step 300 is shown in FIG. 4.

According to one particular embodiment, step 310 checks the status of the clutch and accelerator pedals, along with other pertinent vehicle operating conditions such as gear shifter selection, steering angle, etc. If these vehicle operating conditions indicate that the driver has sufficiently let up on the accelerator pedal, the step 314 may return control of the process back to node A for further monitoring. This check is somewhat similar to that made by takeoff subsystem 14 in step 214 where the third stage pertains to a throttle lift condition or the like. Significant reduction in accelerator pedal engagement may suggest that the performance driving event is no longer being performed and that normal operation can resume.

If step 314 determines that the accelerator pedal is sufficiently engaged, then step 320 may control one or more aspects of engine operation according to one of a variety of techniques. In one embodiment, step 320 limits or otherwise manipulates the engine torque and/or speed during a no-lift upshift so that the engine does not exceed a rev limiter when the clutch and the accelerator are simultaneously engaged. It may also be desirable to match the engine speed with the next gear to which the driver is upshifting, and/or blend the engine torque with the engine toque being requested by the driver through the accelerator pedal. A variety of engine speed and torque limiting and matching techniques could be used, including the use of engine speed command signals that operate the throttle valve and the use of engine torque command signals that control the ignition timing and fuel cut-out features.

Step 324 may be used to check and see if any other performance driving subsystems for higher speeds, like cornering subsystem 16, are active. As previously explained, there may be instances where the vehicle operating conditions warrant the activation of multiple vehicle subsystems. In such an instance, method 100 can employ different techniques for managing or arbitrating between the different vehicle subsystems so that they can work effectively together. Consider the example where the driver performs a no-lift upshift and, while executing this maneuver, enters an aggressive turn. Detecting this scenario, step 324 could cause step 330 to control one or more aspects of engine operation according to a blended approach, as already explained in conjunction with step 240. If acceleration sensors 30 detect a significant lateral acceleration (e.g., an acceleration of 4 m/s$^2$ or more), then the blended engine command output can be influenced to a greater extent by cornering subsystem 16. This type of weighted or sliding-scale output, where the contributions from multiple subsystems to the overall engine command signals are weighted based on one or more vehicle operating conditions, was previously described. Because the vehicle is traveling at a speed that exceeds the first speed threshold, performance driving subsystems for lower speeds, such as takeoff subsystem 14, are generally not blended with shifting subsystem 12 at this point; however, cornering and shifting blended command signals are possible.

In step 340, the method checks to see if the clutch pedal is sufficiently released or if it is still engaged. If it is sufficiently released, then the method may stop controlling engine operation via shifting subsystem 12 and return control to node A for continued monitoring. If the clutch is still engaged, then the no-lift upshift or other performance shifting event is still probably being performed and shifting subsystem 12 may continue to provide engine command signals by returning control to step 310 for continued monitoring.

Figure 5:
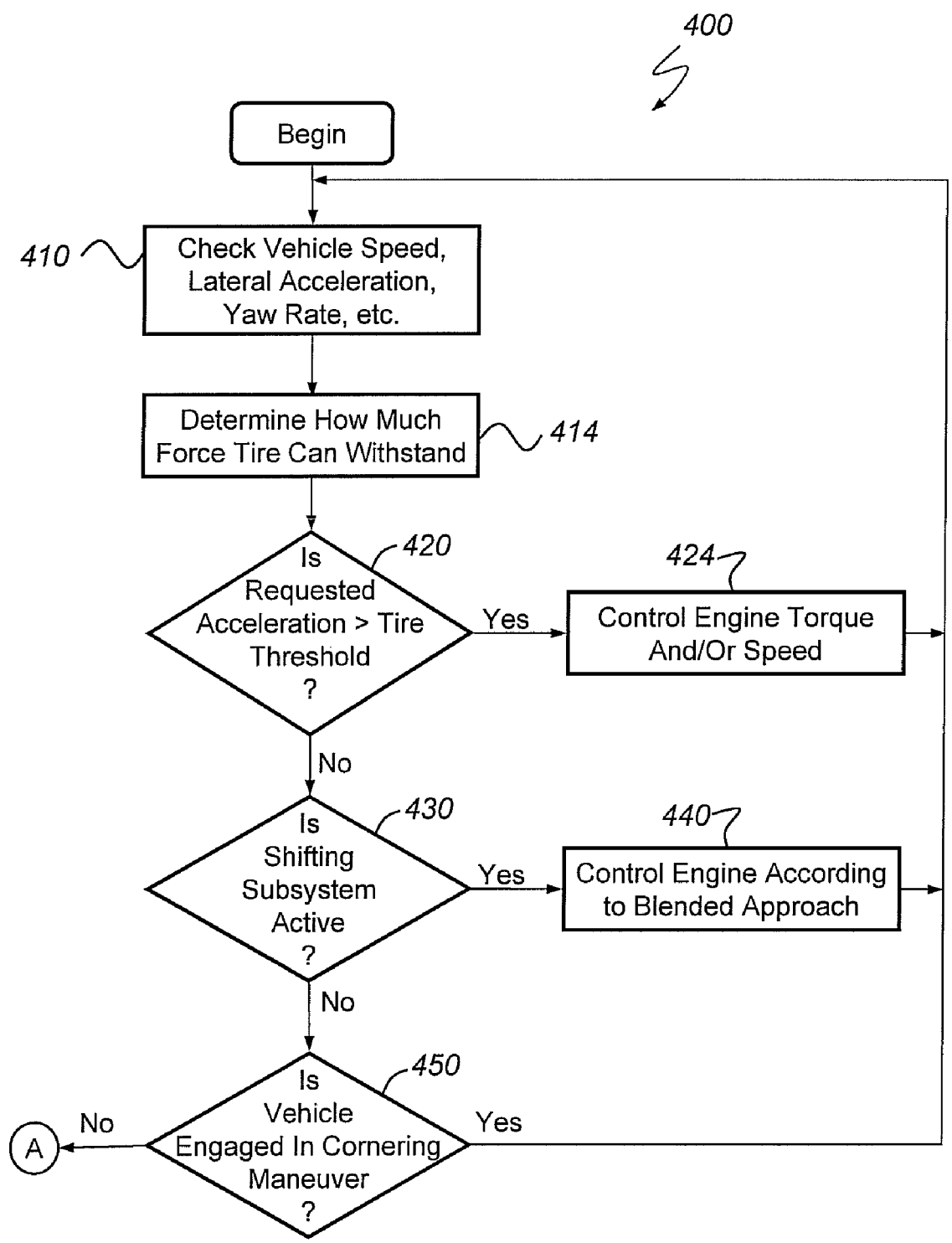
FIG. 5 is a flowchart illustrating an exemplary use of a cornering subsystem for a vehicle, where

Returning to FIG. 2, if step 130 determines that shifting subsystem 12 is not active, then step 140 checks the status of cornering subsystem 16. Step 140 may use any combination of vehicle operating conditions, it may query the subsystem directly, or use any other technique to determine if cornering subsystem 16 is active or should be active. If the method determines that cornering subsystem 16 is active, then one or more aspects of engine operation may be controlled with that subsystem, step 400. A more detailed illustration of an exemplary embodiment of step 400 is shown in FIG. 5, where the cornering subsystem may temporarily provide engine command signals when the vehicle is entering or exiting an aggressive turn, for example.

Step 410 may sample any combination of vehicle operating conditions or other inputs, including vehicle speed, lateral acceleration, yaw rate, etc. In one exemplary embodiment, step 414 uses this input to determine how much force the tire can withstand on a lateral and/or longitudinal basis; there are a variety of techniques that could be used to perform this calculation. If step 420 determines that the driver is requesting too much acceleration via the accelerator pedal (i.e., the resultant forces on the tire exceed some tire threshold), then cornering subsystem 16 can limit the engine torque, engine speed and/or some other operating parameter in order to bring the anticipated force on the tires to a more desirable level, step 424. Once this step has finished, control of the method may return to step 410 for continued monitoring.

If step 420 determines that the requested acceleration does not exceed a tire threshold, then step 430 checks to see if shifting subsystem 12 or any other higher speed subsystems are active (generally, takeoff subsystem 14 would not be available at this point because the vehicle is traveling at a speed greater than the first speed threshold; however, this is not necessary as takeoff subsystem and/or other lower speed subsystems could be checked for their activation status). If shifting subsystem 12 is active, then step 440 may provide engine command signals according to a blended approach, as explained above in more detail. The vehicle speed, lateral acceleration, yaw rate and/or any other vehicle operating condition could be used in the process of weighting or adjusting the contributions from the different active subsystems to the overall engine command signals. Once this step has finished, control of the method may return to step 410 for continued monitoring.

At this point, step 450 can check to see if the vehicle is still engaged in the cornering or handling maneuver that prompted activation of cornering subsystem 16 in the first place. If the vehicle is still engaged in such a maneuver, then control may return to step 410 for continued operation of cornering subsystem 16. If, however, the cornering conditions have abated and the vehicle is no longer engaged in or likely to be engaged in such a cornering maneuver, then control may return to node A for further monitoring. Method 100 may terminate when the vehicle ignition is turned off or at some other termination event, for example. It should be appreciated that the foregoing description of exemplary method 100 is only for purposes of illustration and that the present method and system could be implemented in one of a number of different ways. For instance, the number, combination and/or order of the various steps in method 100 could be different from those illustrated in FIGS. 2-5. Also, the particular number and combination of vehicle subsystems could vary, as method 100 could be used with any vehicle subsystem that provides command signals, including non-engine command signals.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for controlling a vehicle engine, comprising the steps of:
(a) sensing at least one vehicle operating condition;
(b) determining if multiple vehicle subsystems are active, wherein an active vehicle subsystem can provide command signals for temporarily controlling the vehicle engine; and
(c) if multiple vehicle subsystems are active, then using the vehicle operating condition to automatically manage the output of the multiple vehicle subsystems so that the vehicle subsystems function together properly.

2. The method of claim 1, wherein step (a) further comprises sensing at least one vehicle operating condition that is selected from the group consisting of: a steering wheel angle, an accelerator pedal position, a clutch pedal position, a gear shifter selection, a vehicle acceleration, a yaw rate, a vehicle speed, an engine speed, an engine torque, or a throttle valve position.

3. The method of claim 1, wherein step (a) further comprises sensing a vehicle speed and comparing the sensed vehicle speed to a first speed threshold; and
if the sensed vehicle speed is less than the first speed threshold, then step (b) further comprises determining if one or more performance driving subsystems for lower speeds are active; and
if the sensed vehicle speed is greater than the first speed threshold, then step (b) further comprises determining if one or more performance driving subsystems for higher speeds are active.

4. The method of claim 3, wherein the first speed threshold is within the range 0-15 km/h, inclusive.

5. The method of claim 1, wherein step (b) further comprises determining if multiple performance driving subsystems are active, and at least one of the performance driving subsystems is selected from the group consisting of: a shifting subsystem, a takeoff subsystem, or a cornering subsystem.

6. A method for controlling a vehicle engine, comprising the steps of:
(a) sensing at least one vehicle operating condition;
(b) determining if multiple vehicle subsystems are active including a takeoff subsystem, where an active vehicle subsystem can provide command signals for temporarily controlling the vehicle engine, and the takeoff subsystem is a performance driving subsystem that provides engine command signals during performance takeoff events that involve vehicle acceleration; and
(c) if multiple vehicle subsystems are active, then using the vehicle operating condition to manage the output of the multiple vehicle subsystems.

7. The method of claim 6, wherein the takeoff subsystem provides engine speed command signals during a first stage of operation and engine torque command signals during a second stage of operation, and the first and second stages of operation are determined by clutch pedal position.

8. The method of claim 1, wherein step (b) further comprises determining if a shifting subsystem is active, and the shifting subsystem is a performance driving subsystem that provides engine command signals during performance shifting events that involve a manual or automatic transmission.

9. The method of claim 1, wherein step (b) further comprises determining if a cornering subsystem is active, and the cornering subsystem is a performance driving subsystem that provides engine command signals during performance takeoff events that involve cornering or handling.

10. The method of claim 1, wherein step (c) further comprises managing the output of the multiple vehicle subsystems by providing command signals from a single vehicle subsystem, and the single vehicle subsystem is selected with the use of at least one vehicle operating condition.

11. The method of claim 1, wherein step (c) further comprises managing the output of the multiple vehicle subsystems by blending engine command signals from a plurality of vehicle subsystems, and the plurality of vehicle subsystems are selected with the use of at least one vehicle operating condition.

12. The method of claim 11, wherein the blended engine command signals are from at least one vehicle subsystem selected from the group consisting of: a takeoff subsystem, a shifting subsystem, or a cornering subsystem.

13. The method of claim 11, wherein the blended engine command signals are weighted according to one or more vehicle operating condition(s).

14. The method of claim 13, wherein the blended engine command signals are weighted according to a vehicle acceleration.

15. The method of claim 1, wherein step (c) further comprises managing the output of the multiple vehicle subsystems and controlling at least one of: engine torque or engine speed.

16. A method for controlling a vehicle engine, comprising the steps of:
   (a) receiving engine command signals from first and second vehicle subsystems;
   (b) producing blended engine command signals from the engine command signals received from the first and second vehicle subsystems, wherein the blended engine command signals incorporate output from the first and second vehicle subsystems; and
   (c) controlling the vehicle engine with the blended engine command signals.

17. The method of claim 16, wherein step (a) further comprises receiving engine command signals from at least one performance driving subsystem selected from the group consisting of: a shifting subsystem, a takeoff subsystem, or a cornering subsystem.

18. The method of claim 17, wherein step (a) further comprises receiving engine command signals at a fraction control module.

19. The method of claim 16, wherein the blended engine command signals are weighted according to one or more vehicle operating condition(s).

20. The method of claim 19, wherein at least one of the vehicle operating condition(s) is selected from the group consisting of: a steering wheel angle, an accelerator pedal position, a clutch pedal position, a gear shifter selection, a vehicle acceleration, a yaw rate, a vehicle speed, an engine speed, an engine torque, or a throttle valve position.

21. An engine control system for use with a vehicle, comprising:
   a sensor for providing at least one vehicle operating condition;
   a first vehicle subsystem for providing a first set of engine command signals;
   a second vehicle subsystem for providing a second set of engine command signals; and
   an electronic vehicle module coupled to the sensor, the first vehicle subsystem, and the second vehicle subsystem for receiving the vehicle operating condition, the first set of engine command signals, and the second set of engine command signals, respectively, wherein the electronic vehicle module uses the vehicle operating condition to automatically manage the first and second set of engine command signals so that the vehicle subsystems function together properly.

22. The engine control system of claim 21, wherein:
   the first vehicle subsystem is selected from the group consisting of: a takeoff subsystem, a shifting subsystem, or a cornering subsystem;
   the second vehicle subsystem is selected from the group consisting of: a takeoff subsystem, a shifting subsystem, or a cornering subsystem; and
   the electronic vehicle module is a traction control module for a vehicle.

* * * * *